United States Patent [19]

Dietz et al.

[11] Patent Number: 4,960,935
[45] Date of Patent: Oct. 2, 1990

[54] BISPHENOL DERIVATIVES, PROCESS FOR THEIR MANUFACTURE, AND THEIR USE AS SURFACTANTS

[75] Inventors: Erwin Dietz, Kelkheim; Erich Hoffmann, Kriftel; Joachim Weide, Kelkheim, all of Fed. Rep. of Germany

[73] Assignee: Hoechst Aktiengesellschaft, Frankfurt am Main, Fed. Rep. of Germany

[21] Appl. No.: 477,837

[22] Filed: Mar. 23, 1983

Related U.S. Application Data

[63] Continuation of Ser. No. 281,341, Jul. 8, 1981, abandoned.

[30] Foreign Application Priority Data

Jul. 10, 1980 [DE] Fed. Rep. of Germany ....... 3026127

[51] Int. Cl.$^5$ .............................................. C07C 93/06
[52] U.S. Cl. .................... 564/325; 106/14.15
[58] Field of Search ............... 564/325, 347; 260/29.6; 106/25

[56] References Cited

U.S. PATENT DOCUMENTS

| | | | |
|---|---|---|---|
| 2,325,514 | 7/1943 | Hester | 564/504 |
| 2,355,337 | 8/1944 | Spence | 564/504 X |
| 2,723,241 | 11/1955 | DeGroote et al. | 564/349 X |
| 2,792,367 | 5/1957 | DeGroote et al. | 564/325 X |
| 2,819,222 | 1/1958 | DeGroote et al. | 564/325 X |
| 2,819,223 | 1/1958 | DeGroote et al. | 564/325 X |
| 2,828,280 | 3/1958 | DeGroote et al. | 564/349 X |
| 2,828,281 | 3/1958 | DeGroote et al. | 564/349 X |
| 3,033,640 | 5/1962 | Hofer et al. | 564/325 X |
| 3,298,859 | 1/1967 | Wong et al. | 564/325 X |
| 3,853,770 | 12/1974 | Altschuler | 564/325 X |

FOREIGN PATENT DOCUMENTS 0017189 10/1980 European Pat. Off. ............ 564/325

Primary Examiner—Robert V. Hines
Attorney, Agent, or Firm—Curtis, Morris & Safford

[57] ABSTRACT

Compounds of the general formula $$X-Y-O-(A-O-Y-O)_m-A-O-Y-X \qquad (1)$$

wherein X is a radical of the general formula $$[R^1-G_p-(O-CHR^2-CHR^3-)_n]_2N- \qquad (1a)$$

in which $R^1$ is a saturated aliphatic radical of from 6 to 30 carbon atoms or an unsaturated aliphatic radical having one or several ethylenic bonds and being of from 6 to 30 carbon atoms, G is phenylene or naphthylene, p is zero or 1, $R^2$ and $R^3$ are hydrogen or methyl, but are not both methyl, and n is a number from 0 to 25, Y is a radical of the formula $$\begin{array}{c} -CH_2CH-CH_2- \\ | \\ (O.CHR^2.CHR^3)_q.OH \end{array} \qquad (1b)$$

in which $R^2$ and $R^3$ have the indicated meanings and q represents identical or different numbers from 0 to about 200, A is a radical of the general formula

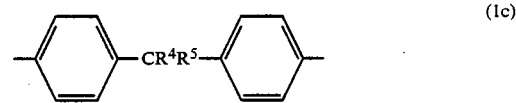 (1c)

in which $R^4$ and $R^5$ are hydrogen or alkyl of from 1 to 3 carbon atoms, and m is a number from zero to 5, n and q not being both zero; and their use, in particular as dispersing agents, are disclosed.

8 Claims, No Drawings

BISPHENOL DERIVATIVES, PROCESS FOR THEIR MANUFACTURE, AND THEIR USE AS SURFACTANTS

The invention relates to compounds of the general formula

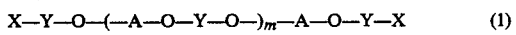
$$X-Y-O-(-A-O-Y-O-)_m-A-O-Y-X \quad (1)$$

wherein X denotes a radical of the general formula

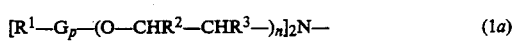
$$[R^1-G_p-(O-CHR^2-CHR^3-)_n]_2N- \quad (1a)$$

in which $R^1$ is a saturated aliphatic radical having 6 to 30 carbon atoms or an unsaturated aliphatic radical having one or several ethylenic bonds and 6 to 30 carbon atoms, G is phenylene or naphthylene, p is zero or 1, $R^2$ and $R^3$ are hydrogen or methyl, but are not both methyl, and n is a number from 0 to 25, Y denotes a radical of the formula

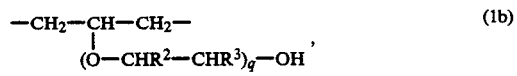
$$\begin{array}{c} -CH_2-CH-CH_2- \\ | \\ (O-CHR^2-CHR^3)_q-OH \end{array} \quad (1b)$$

in which $R^2$ and $R^3$ have the indicated meanings and q represents identical or different numbers from 0 to about 200, A denotes a radical of the general formula

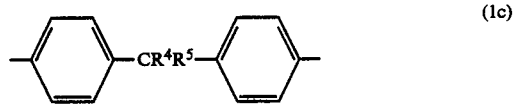

(1c)

in which $R^4$ and $R^5$ are hydrogen or alkyl having 1 to 3 carbon atoms, and m is a number from zero to 5, n and q not both being zero.

Those compounds are preferred in which $R^1$ is a saturated aliphatic radical having 6 to 20 carbon atoms or an unsaturated aliphatic radical having 1 or 2 double bonds and 6 to 20 carbon atoms, in particular the radical of a fatty alcohol from natural fats and oils, the radical of an alcohol from the oxo synthesis or the radical of an alkylphenol or possibly also of an alkylnaphthol, such as are conventional in the surfactant sector. Preferably, p is zero; if it is 1, G is preferably phenylene, in particular p-phenylene, n is a number from 1 to 15, q is a number from 10 to 100, $R^4$ and $R^5$ are hydrogen or methyl and m is zero. The polyoxyalkylene group in the formula (1b) is preferably a polyoxyethylene chain or a block copolymer chain of propylene oxide and ethylene oxide units, q being a number from 10 to 100.

The invention also relates to the preparation of the compounds of the formula (1), which comprises subjecting 2 moles of an amine of the general formula

$$H-X \quad (2)$$

in which X has the meaning indicated above, to a condensation reaction with a bis-epoxide of the general formula

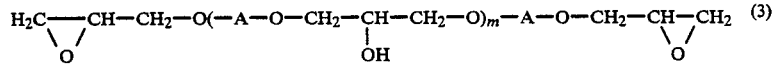

(3)

in which A and m have the meaning indicated above, at temperatures from 80° to 200° C. in the presence of an acid catalyst and reacting the condensation product with (m+2)q moles of ethylene oxide and/or propylene oxide at 100° to 200° C. in the presence of a basic catalyst, q having the meaning indicated above.

The invention also relates to the use of the compounds of the formula (1) as surfactants, in particular as dispersing agents. The compounds are especially suitable for dispersing solids in aqueous fluids, in particular for colorants, above all for pigments. A particularly preferred field of application is the preparation of aqueous printing inks and emulsion paints.

The starting materials of the formula (2) are known from German Offenlegungsschrift No. 2,555,895.

The bis-epoxides of the general formula (3) can be prepared, for example, by reacting 2,2-bis-(4-hydroxyphenyl)-methane, 2,2-bis-(4-hydroxyphenyl)-propane or 2,2-bis-(4-hydroxyphenyl)-butane with epichlorohydrin (Ullmanns Enzyklopädie der Technischen Chemie [Ullmann's Encyclopedia of Industrial Chemistry], 3rd Edition, 8th Volume (1957), pages 431 et seq.).

The surfactant properties of the claimed compounds result from the presence of hydrophilic and hydrophobic structures in the molecule, the hydrophilic properties essentially being provided by the polyoxyalkylene chains. The desired surfactant properties can be influenced within wide limits by the selection of the starting materials of the formulae (2) and (3) on the one hand and by the nature and quantity of the alkylene oxide on the other hand. Advantageously, the quantity of alkylene oxide is such that compounds are obtained which give clear solutions in water.

The condensation of the compounds (2) and (3) is advantageously carried out at temperatures above 100° C., in particular at temperatures between 120° and 180° C. It is expedient to carry out the reaction with exclusion of oxygen. Acid catalysts which can be used are, in particular, Lewis acids, for example aluminum chloride, boron trifluoride/ether complexes and phenols.

The oxyalkylation of the condensation products obtained from the amines (2) and bis-epoxides (3) is expediently carried out in the presence of strongly basic catalysts, such as potassium hydroxide, sodium hydroxide or alkali metal alcoholates, for example sodium methylate. Advantageously, the temperature is in the range from 120° to 180° C., in particular between 150° and 170° C. The oxyalkylation can be carried out with ethylene oxide alone or with a mixture of ethylene oxide and propylene oxide. It is also possible, however, first to introduce a polyoxypropylene chain into the surfactant molecule, by means of propylene oxide, and then to introduce a polyoxyethylene chain by means of ethylene oxide. The quantity of ethylene oxide preferably is such that the compounds obtained are readily soluble in water. The oxyalkylation can be carried out without pressure or in pressure vessels. The preferred working pressure is 2 to 8 bars.

The surfactants according to the invention are suitable for dispersing solids, in particular in aqueous fluids. Dispersions which contain, for example, finely particulate ores, minerals, sparingly soluble or insoluble salts, wax particles or plastic particles, plant protection agents and pesticides and optical brighteners, in particular dyes and pigments, as the solids may be mentioned.

The suitability of the surfactants according to the invention for the preparation of pigment dispersions should be particularly singled out. Pigment dispersions of this type can contain inorganic and/or organic pigments. Examples of suitable inorganic pigments are white pigments and colored pigments, such as titanium oxides, zinc oxides, zinc sulfides, cadmium sulfides or cadmium selenides, iron oxides, chromium oxides, chromate pigments and mixed oxides suitable as pigments and obtained from the elements aluminum, antimony, chromium, iron, cobalt, copper, nickel, titanium and zinc, and also grades of carbon black and extender pigments.

The following may be mentioned as examples of suitable organic pigments: azo pigments, azamethines, azaporphines, quinacridones, flavanthrone compounds, anthanthrone compounds and pyranthrone compounds, derivatives of naphthalene tetracarboxylic acid, of perylene tetracarboxylic acid, of thioindigo, of dioxazine and of tetrachloroisoindolinone, laked pigments, such as the Mg, Ca, Sr, Ba, Al, Mn, Co and Ni salts of dyes containing acid groups, and also corresponding pigment mixtures.

In addition to the surfactants according to the invention, the solids dispersions can also contain further conventional additives, such as foam regulators and viscosity regulators, anti-settling agents, wetting agents and solvents, hydrotropic agents, preservatives, agents which prevent or retard drying up, and anionic, cationic, non-ionic or amphoteric known surfactants and protective colloids.

The known surfactants can be those which are described, for example, in K. Lindner: Tenside, Textilhilfsmittel, Waschrohstoffe [Surfactants, Textile Auxiliaries, Detergent Raw Materials], in N. Schönfeldt: Grenzflächenaktive Äthylenoxydaddukte, ihre Herstellung, Eigenschaften, Anwendung und Analyse [Surface-active ethylene oxide adducts, their manufacture, properties, use and analysis] and in McCutcheon, Detergents & Emulsifiers, International Edition 1978.

The preservatives can be substances such as have been compiled, for example, by K.-H. Wallhäußer and W. Fink in Farbe und Lack, Volume 82 (1976), No. 2, pages 108–125.

Suitable additives which prevent or retard drying-up of the solids dispersions are above all substances which have a low volatility and complete or limited miscibility with water, such as, for example, polyhydric alcohols as well as their ethers and their reaction products with ethylene oxide or propylene oxide, in particular glycols, glycol ethers and polyglycols, and acid amides, in particular formamide, urea and 1-methyl-2-pyrrolidone. Additives of this type can be used alone or as a mixture with one another.

Depending on the hardness of the particles of the solids used, the preparation of the solids dispersions can be carried out, for example, by means of agitators, dissolvers, rotor/stator mills, ball mills, stirred ball mills (sand mills or bead mills), in high-speed mixers, kneading apparatus or on roll mills.

Preferred dispersions contain 4 to 85, preferably 30 to 80, % by weight of solids, 1 to 30, preferably 2 to 15, % by weight of the surfactants according to the invention and 5 to 95, preferably 10 to 60, % by weight of water including further possible additives.

Solids dispersions which contain the surfactants according to the invention have a high stability and a high solids content, coupled at the same time with good rheological properties.

If pigments are used as the solids, pigment dispersions are obtained which are versatile in use. They are suitable, for example, for coloring (pigmenting) emulsion paints and wallpaper paints, water-dilutable lacquers, wood stains, paper pulps, printing inks for textile printing, gravure printing, flexographic printing and other printing processes, and for use in spin-dyeing.

The good dispersing properties of the surfactants according to the invention lead to pigment dispersions having a high tinctorial strength and brightness. Compared with pigment dispersions containing conventional surfactants, the pigment dispersions containing the surfactants according to the invention are distinguished by a broad compatibility with the most diverse aqueous binder systems, in particular aqueous printing inks, and a particularly high stability to flocculation, above all in comparison with plastic dispersions and paints containing cellulose ethers.

EXAMPLES

Preparation Example 1:

340 g of an ether-amine of the formula $[R^1—(O—CH_2—CH_2)_5]_2NH$ in which $R^1$ represents the alkyl radical of coconut fatty alcohol (having a mean molecular weight of 880), 72.6 g of a diglycidyl ether of 2,2-bis-(4-hydroxyphenyl)-propane (Epon number 193, molecular weight found to be 378) and 0.6 g of phenol as a catalyst are initially introduced into a 500 ml flask fitted with a reflux condenser, stirrer and internal thermometer, and the mixture is slowly heated to 150° C. under a nitrogen atmosphere and is kept at this temperature for 16 hours. After cooling, a yellow, viscous fluid having an Epon number of less than 1 is obtained.

(a) 162 g of the addition product obtained are oxyethylated with 190 g of ethylene oxide at 170° C. in a pressure vessel, in the presence of 0.75 g of powdered potassium hydroxide. The waxy reaction product of pale brownish color has a turbidity point of 73° C. in water (according to DIN 53,917).

(b) 115 g of the addition product obtained are reacted, after the addition of 1 g of powdered sodium hydroxide, in an autoclave with 285 g of ethylene oxide. The brownish waxy surfactant has a turbidity point of 91° C.

(c) After mixing with 1.3 g of sodium hydroxide powder, 130 g of the addition product obtained are reacted in a pressure vessel with 17 g of propylene oxide and subsequently with 172 g of ethylene oxide. The waxy, mixed oxyalkylate shows a turbidity point of 73° C. in aqueous solution.

Preparation Example 2:

Corresponding to Example 1, 253 g of an addition product of 2 moles of an ether-amine of the formula $[C_{17}H_{33}—(O—CH_2—CH_2—)_{12}]_2NH$ and 1 mole of the diglycidyl ether of 2,2-bis-(4-hydroxyphenyl)-propane are oxyethylated, in the presence of 1 g of potassium hydroxide powder, with 618 g of ethylene oxide at 170° C. in a pressure vessel. The brownish, waxy surfactant obtained has a turbidity point of 90° C. in water.

Preparation Example 3:

Analogously to Example 1, 230 g of ethylene oxide are added in the course of 6 hours to 185 g of the addition product of 2 moles of the ether-amine from Example 1 and 1 mole of the diglycidyl ether of 2,2-bis-(4-hydroxyphenyl)-methane in a pressure vessel, in the presence of 0.5 g of sodium hydroxide powder. The resulting brownish, waxy surfactant has a turbidity point of 80° C. in water.

Preparation Example 4:

180 g of the secondary ether-amine from Example 1 are, with the addition of 0.5 g of phenol, reacted as described in Example 1 with 95.5 g of a compound of the following formula

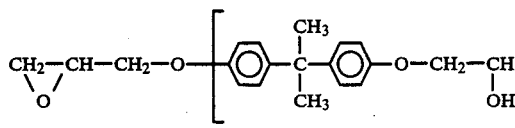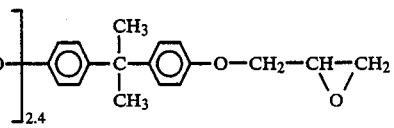

1 g of potassium hydroxide powder is added to 150 g of this reaction product, and the mixture is reacted in a pressure vessel with 147 g of ethylene oxide at 160° C. The brownish, waxy polyoxyalkylate shows a turbidity point of 77° C. in aqueous solution.

Preparation Example 5:

Corresponding to Example 1, 169 g of an adduct of 2 moles of an ether-amine of the formula $[R^1-(O-CH_2-CH_2-)_8]_2NH$ in which $R^1$ represents the alkyl radical of tallow fatty alcohol, and 1 mole of the diglycidyl ether of 2,2-bis-(4-hydroxyphenyl)-propane are reacted, after the addition of 1 g of sodium hydroxide powder, with 110 g of ethylene oxide. The turbidity point of the brownish, waxy surfactant is 72° C.

Preparation Example 6:

Corresponding to Example 1, 295 g of an adduct of 2 moles of an ether-amine of the formula $[R^1-(O-CH_2-CH_2-)_{10}]_2NH$ in which $R^1$ represents the alkyl radical of coconut fatty alcohol, and 1 mole of the diglycidyl ether of 2,2-bis-(4-hydroxyphenyl)-propane are reacted, after the addition of 1 g of sodium hydroxide powder, with 226 g of ethylene oxide. The waxy, brownish polyoxyalkylate has a turbidity point of 74° C. in water.

Preparation Example 7:

Corresponding to Example 1, 161 g of an adduct of 2 moles of ether-amine of the formula $[iso-C_{13}H_{27}-(O-CH_2-CH_2)_8]_2NH$ and 1 mole of the diglycidyl ether of 2,2-bis-(4-hydroxyphenyl)-propane are reacted, after the addition of 1 g of sodium hydroxide powder, with 197 g of ethylene oxide. The brownish reaction product obtained has a waxy consistency and has a turbidity point of 78° C. in water.

Preparation Example 8:

Corresponding to Example 1, 210 g of an addition product of 2 moles of a secondary ether-amine of the formula

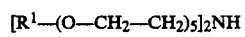

in which $R^1$ represents a 4-isononylphenyl radical, and 1 mole of the diglycidyl ether of 2,2-bis-(4-hydroxyphenyl)propane are oxyethylated, in the presence of 0.9 g of potassium hydroxide powder, with 242 g of ethylene oxide at 170° C. in a pressure vessel. The brownish waxy surfactant obtained has a turbidity point of 80° C. in water.

In the application examples which follow, parts are parts by weight.

Application Example 1:

700 parts of ground dolomite are dispersed by means of a dissolver for 0.5 hour in a mixture of
  10 parts of oleic acid,
  30 parts of the surfactant from Preparation Example 2 and
  193 parts of water, with the addition of
  10 parts of highly disperse, pyrogenic silica. By the addition of
  57 parts of water, a flowable, slightly thixotropic and pumpable dispersion having good storage stability is obtained.

Application Example 2:

700 parts of an iron oxide red pigment are introduced in portions into a mixture of
  40 parts of the surfactant from Preparation Example 3,
  5 parts of tallow-fatty alkyl-propylenediamine,
  100 parts of 2-ethyl-2-(hydroxymethyl)-propane-1,3-diol and
  130 parts of water and are dispersed by means of a dissolver down to a particle fineness smaller than 5 μm. After dilution with
  25 parts of water, a pigment preparation having good rheological properties is obtained, which is particularly suitable for coloring aqueous paints based on plastic dispersions.

When this pigment preparation is stirred, for example in a concentration of 2% by weight, into an emulsion paint which contains a copolymer of styrene and an acrylate as the binder and a methylhydroxyethyl-cellulose as the cellulose ether, and the colored dispersion paint is brushed onto paper, a deep coloring is obtained which does not show any flocculation phenomena in the rub-out test (German Auslegeschrift No. 2,638,946, column 3).

Application Example 3:

Corresponding to Application Example 2, a pigment dispersion of
  800 parts of a chromium oxide green pigment,
  22 parts of the surfactant from Preparation Example 2,
  3 parts of N-oleoylsarcosine,
  50 parts of ethylene glycol and
  125 parts of water is prepared. The properties of this pigment dispersion are comparable with those of the dispersion of Application Example 2.

Application Example 4:

370 parts of C.I. Pigment Violet 23 (Colour Index No. 51,319) which, on finishing, has been modified according to Example 12 of German Auslegeschrift No. 2,731,175, are dispersed in the presence of 100 parts of the surfactant from Preparation Example 1c and 150 parts of ethylene glycol, in a twin-trough kneader. Subsequently, the kneading composition is diluted with 110 parts of ethylene glycol, 268 parts of water and 2 parts of a preservative to give a storage-stable dispersion which has very good rheological properties and which is particularly suitable for coloring aqueous binder systems for the paint sector and textile pigment printing.

When this pigment dispersion, for example in a concentration of 1% by weight, is stirred into the emulsion paint described in Application Example 2 and is spread on paper, this gives deep, bright colorings and a fault-free rub-out test.

Comparably good results are achieved when the 100 parts of the surfactant from Preparation Example 1c are replaced by 100 parts of the surfactant from Preparation Example 1a and the 260 parts of ethylene glycol are replaced by 260 parts of formamide.

Application Example 5:

Corresponding to Application Example 4, 400 parts of C.I. Pigment Red 168 (Colour Index No. 59,300) are dispersed with 80 parts of the surfactant from Preparation Example 6 and 115 parts of 1,2-propanediol in a kneader, and the mixture is diluted with a further 35 parts of 1,2-propanediol and 370 parts of water to give a very highly flowable dispersion which, above all in the sector of aqueous paints based on plastic dispersions, allows the excellent coloristic properties and the good flocculation stability to be fully developed.

A pigment dispersion having similarly good properties is obtained when the 80 parts of the surfactant from Preparation Example 6 are replaced by 80 parts of the surfactant from Preparation Example 4 and the 150 parts of 1,2-propanediol in total are replaced by 100 parts of glycerol and 50 parts of 1-methyl-2-pyrrolidone.

Application Example 6:

480 parts of Pigment Red 112 (Colour Index No. 12,370) are dispersed for 1 hour, in a twin-trough kneader, with 90 parts of the surfactant from Preparation Example 1b, 10 parts of the sodium salt of a sulfuric acid half-ester of an adduct of 7 moles of ethylene oxide and 1 mole of tributylphenol, 100 parts of ethylene glycol and 70 parts of water. Subsequently, the kneading composition is diluted by the addition of 250 parts of water to give a storage-stable, mobile pigment preparation which is outstandingly suitable for coloring aqueous flexographic printing inks or gravure printing inks and for pigmenting aqueous paints based on plastic dispersions.

Application Example 7:

420 parts of a pigment carbon black having a specific surface area according to BET of 85 $m^2/g$ are stirred into a solution of 60 parts of the surfactant from Preparation Example 1a, 100 parts of ethylene glycol and 340 parts of water. This suspension is ground in a stirred ball mill with 1 mm Siliquartzite beads and is then diluted by the addition of 80 parts of water. The storage-stable pigment dispersion obtained in this way is outstandingly suitable for use in aqueous flexographic printing inks and gravure printing inks.

Application Example 8:

450 parts of a pigment obtained by mixed coupling of diazotized 3,3'-dichlorobenzidine with acetoacetic acid anilide and acetoacetic acid p-anisidide in a ratio of 9:1 are dispersed with 80 parts of the surfactant from Preparation Example 5 and 160 parts of water for 2 hours in a twin-trough kneader. By the addition of 100 parts of ethylene glycol and 210 parts of water, a mobile pigment preparation is obtained which can be diluted further with water in any proportion. It is particularly suitable for coloring water-containing binder systems.

Application Example 9:

In a stirred ball mill, a suspension of 450 parts of C.I. Pigment Green 7 (Colour Index No. 74,260), 60 parts of the surfactant from Preparation Example 1c, 40 parts of an adduct of 11 moles of ethylene oxide and 1 mole of nonylphenol, 50 parts of urea, 100 parts of diethylene glycol, 258 parts of water and 2 parts of a preservative is ground with 1 mm Siliquartzite beads and is then diluted with a further 40 parts of water to give a pigment dispersion having very good rheological properties. It is suitable above all for pigmenting aqueous paints based on plastic dispersions, in which case it is distinguished by a high flocculation stability and good coloristic properties.

Pigment dispersions having comparably good properties are obtained when the 60 parts of the surfactant from Preparation Example 1c are replaced by 60 parts of the surfactant from Preparation Example 7 or 8.

We claim:

1. A compound of the general formula

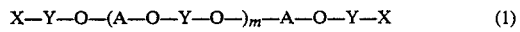

$$X—Y—O—(A—O—Y—O—)_m—A—O—Y—X \qquad (1)$$

wherein X is a radical of the general formula

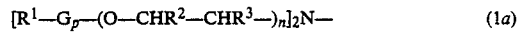

$$[R^1—G_p—(O—CHR^2—CHR^3—)_n]_2N— \qquad (1a)$$

in which $R^1$ is a saturated aliphatic radical of from 6 to 30 carbon atoms or an unsaturated aliphatic radical having one or several ethylenic bonds and being of from 6 to 30 carbon atoms, G is phenylene or naphthylene, p is zero or 1, $R^2$ and $R^3$ are hydrogen or methyl, but are not both methyl, and n is a number from 1 to 15, Y is a radical of the formula

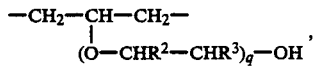

(1b)

in which $R^2$ and $R^3$ have the indicated meanings and q represents identical or different numbers from 10 to 100, A is a radical of the general formula

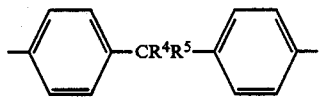

(1c)

in which $R^4$ and $R^5$ are hydrogen or alkyl of from 1 to 3 carbon atoms, and m is a number from zero to 5.

2. A compound as claimed in claim 1, wherein $R^1$ is a saturated aliphatic radical of from 6 to 20 carbon atoms or an unsaturated aliphatic radical having one or two double bonds and being of from 6 to 20 carbon atoms and $R^4$ and $R^5$ are hydrogen or methyl and m is zero.

3. A compound as claimed in claim 1, wherein $R^1$ is the radical of a fatty alcohol from natural fats and oils or the radical of an alcohol from the oxo synthesis.

4. A compound as claimed in claim 1 or 2, wherein p is zero.

5. A compound as claimed in claim 1 or 2, wherein p is 1 and G is phenylene.

6. A process for dispersing a solid in a liquid which comprises adding to said liquid an amount of a compound as claimed in claim 1 sufficient to effect dispersion of said solid.

7. A process as claimed in claim 6, wherein the solid is a pigment.

8. A process as claimed in claim 7, wherein the liquid is an aqueous printing ink or emulsion paint.

* * * * *